Inventors
John E. Anderson
John H. Ballard
Harry E. Potter
By Liverance & Van Antwerp
Attorneys Inventors
John E. Anderson
John H. Ballard
Harry E. Potter
By Liverance & Van Antwerp
Attorneys Patented Apr. 30, 1946

2,399,309

UNITED STATES PATENT OFFICE 2,399,309

GROOVING TOOL

John E. Anderson and John H. Ballard, Muskegon, and Harry E. Potter, Spring Lake, Mich., assignors to Sealed Power Corporation, Muskegon, Mich., a corporation of Michigan Application October 30, 1944, Serial No. 561,068

4 Claims. (Cl. 82—4)

This invention relates to a novel and very effective tool designed to be used in the reconditioning of the ring grooves of pistons, in practice the uppermost groove in a piston which in the service of a piston is subjected to the most severe conditions and becomes irregularly battered and widened at times by wear and the impact of piston rings against the sides thereof, with a resultant deterioration in the sealing qualities of the piston rings located in such uppermost ring grooves. Of course the tool may be also used for the reconditioning of other grooves in the piston though normally it will be used for the most part in connection with the uppermost piston ring groove.

It is a primary object and purpose of the present invention to provide a tool of the general nature stated which may be used in reconditioning a selected piston ring groove or grooves of a piston by applying it directly to the piston and connecting it in a groove below the groove which is to be thus reconditioned, so that it may be manually turned about the piston and, with our invention a groove cutting or finishing tool is carried around the piston and is fed into the groove which is being recut and reconditioned so as to properly reshape and in practice widen the groove for the reception of either the next larger width of piston ring, or the same width of piston ring with a thin ring at a side thereof having the proper dimensions that it together with a piston ring of the original dimensions are properly received within the remachined and reconditioned groove.

An understanding of the invention and a construction which we have devised embodying the same may be had from the following description, taken in connection with the accompanying drawings, in which, Fig. 1 is a plan view of the grooving tool in accordance with our invention.

Like reference characters refer to like parts in the different figures of the drawings.

Figure 1:
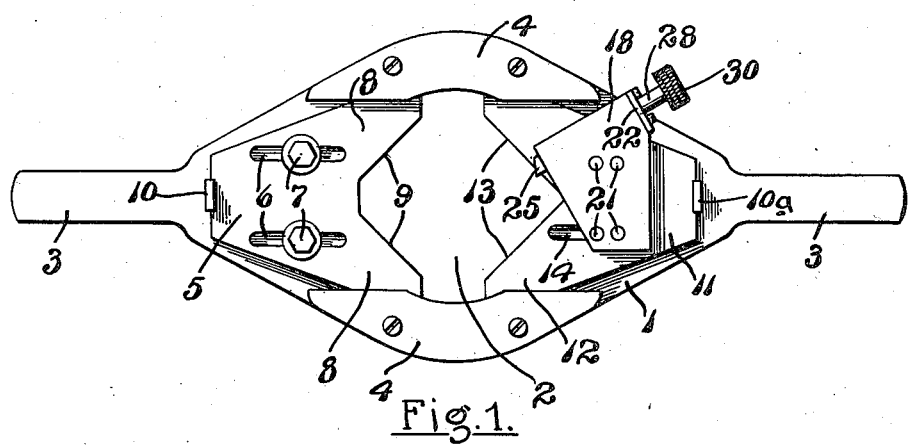
Figure 2:
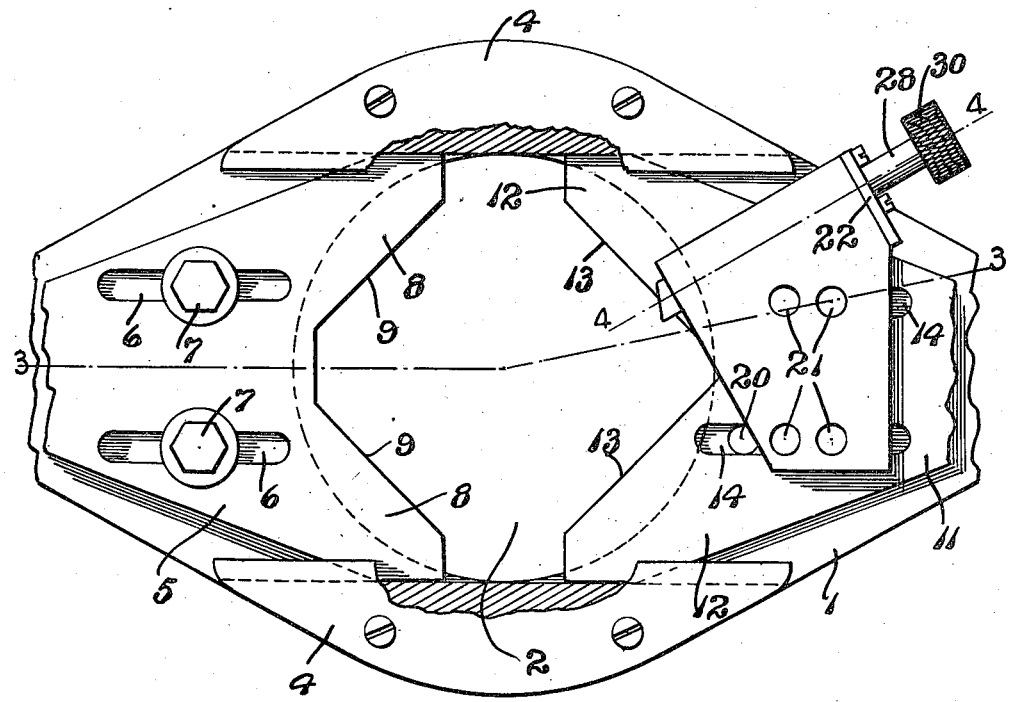
Fig. 2 is a fragmentary enlarged plan view of the central portion of the tool with certain parts broken away and shown in section for a better disclosure.

In the construction shown a body member 1 of a substantially flat form enlarged laterally between its ends is provided with a central circular opening 2, the diameter of which is greater than the diameter of the largest piston which is to be serviced by the tool. At opposite ends of the body 1 handles 3 extend outwardly for engagement by the hands of the operator to turn the tool about the vertical axis of a piston to which it is applied. At opposite sides of the body, parallel guides 4 as shown with overhanging guide edge portions are secured at the upper side of the body for guiding the jaw members of the tool hereafter to be described.

At one side of the opening 2, jaw member 5 is located at the upper side of the body having spaced elongated slots 6 through which cap screws 7 pass threading into the body 1 thereby permitting a ready movement of the jaw member, upon loosening the screws 7 in a direction parallel to the longer dimension of the body. Said jaw member at its inner end is provided with diverging jaws 8 spaced from each other, the inner edges 9 of which are preferably disposed substantially at right angles to each other. Jaw member 5 has the outer edges of its jaws 8 guided by the guides 4 as shown. At its outer end said member 5 is preferably provided with an upturned ear 10 for manual movement of the jaw member when the screws 7 are loosened so as to move said member to a desired position whereupon by tightening the screws 7 it is retained in such position.

At the opposite side of the opening a second jaw member 11 of substantially the same construction is provided, likewise having at its inner end two diverging jaws 12 with inner edges 13 preferably at right angles to each other, and likewise at its outer end being provided with an upturned ear 10a. Said jaw member 11 has two spaced apart longitudinal slots 14 similar to the slot 6 previously described.

Figure 5:
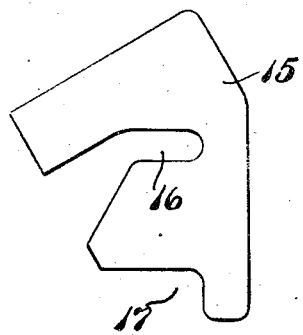
Fig. 5 is a plan of a shim, one or more of which, or different thicknesses of which may be utilized to properly locate the immediate groove cutter in proper relation to the groove which is being recut.

Over the member 11 a desired thickness of shims 15 of flat metal is placed. In practical operation of the tool, said shim of the outline shown in Fig. 5 has a slot 16 which is widened and changed in direction at its outer open end, and said shim is provided with a recess 17 spaced from the slot 16 as shown.

The immediate cutting tool is carried by a block 18 which is located over the shim or shims 15 which in turn are located at the upper side of the jaw member 11. It is to be understood that either a plurality of shims 15, two in number being shown in Figs. 3 and 4 may be used, or various shims of standard thickness may be supplied.

Figure 3:
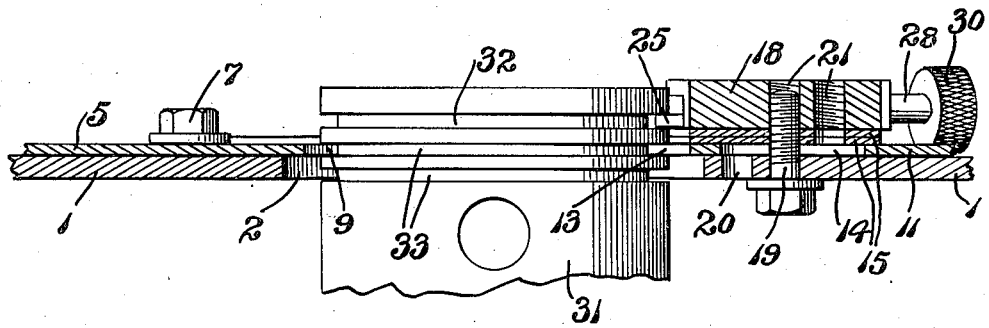
Fig. 3 is a fragmentary vertical section taken substantially on the plane of line 3—3 of Fig. 2, showing the tool applied to a piston.

The block 18 is mounted for adjustment on and above the uppermost shim 15 through a set screw 19 which passes through openings 20 in the body 1, thence through the slots 14 in the jaw member 11, through the slots 16 and at the recesses 17 in the shims 15 and threaded into interiorly threaded openings 21 in the block 18, as shown in Fig. 3. There are two series of openings 20 in the body 1 and a like series of interiorly threaded openings 21 in the block 18, permitting a sufficient adjustment of the block 18 and of the cutting tool carried thereby so as to properly take care of numerous diameters of the pistons by the one grooving tool, the uppermost grooves of which pistons or other grooves if needed, are to be recut and reconditioned.

At the outer side of the block 18, as shown, a vertical plate 22 is mounted at one end of a horizontal passage 23 through the block, at the inner end of which a cutting tool 24 is slidably received, having extending therefrom at its inner end the immediate groove cutting portion 25 thereof. The tool 24 has a longitudinally positioned interiorly threaded opening 26 into which the threaded end of a rod 27 may be screwed. Said rod is extended from a shank 28 of larger diameter, which shank is formed with an angular groove 29 around it near its inner end, the plate 22 being slotted to receive the grooved portion of the shank 28 thereby holding the screw 27 against longitudinal movement but permitting rotative movement. At the outer end of the shank 28 a preferably knurled head 30 is provided for manually turning the rod 27 and thereby inwardly and outwardly adjusting the cutting edge of the cutting tool.

The thickness of the jaw members 5 and 11 is the same as the vertical dimension of a lower groove in a piston 31 into which the bearing edge portions 9 and 13 of the jaws 8 and 12 are received. That is, inasmuch as a normal ⅛" width piston ring groove is always cut with a plus tolerance and, therefore, is always very slightly greater in width than the ⅛" width by which the ring groove is known, the thickness of the jaw members 5 and 11 will be ⅛" with any tolerance permitted always being of a minus instead of a plus character, while the ⅛" width of the groove is never less than such ⅛". Therefore the edge portions of the jaws are receivable in a ring groove of the width dimensions for which the jaws are designed, reaching to the bottom of the groove irrespective of the fact that outer portions of the sides of the groove may have been upset slightly in service so that the groove has been slightly widened from a short distance out from its bottom.

In the use and operation of the grooving tool of our invention, a piston 31 for example having an upper groove 32 which is to be recut and with lower grooves 33, two being shown, though the number may vary, is inserted at its upper grooved portion through the opening 2 in the body, the set screw 7 having been loosened to move the jaw member 5 outwardly a sufficient distance for such passage. The jaw member 11 has previously been secured in its proper place for the diameter of the piston which is to have the upper groove 32 thereof recut; and the proper thickness of shim or shims 15 have been disposed between the upper side of the jaw 1 and the lower side of the tool carrying block 18 so that the cutting portion 25 of the tool will properly enter such upper groove 32 when the jaw members are connected and associated with a lower ring groove 33. After the jaws 12 have been brought into one of the lower grooves so that their inner edges 13 engage the bottom of said lower ring groove the opposite jaw member 5 is moved toward the piston until the inner edges 9 of the jaws 8 engage the bottom of the same groove, the cap screws 7 thereupon being tightened. This mounts the tool upon the piston so that it may be turned about the vertical axis of the piston by grasping the handles 3. It is of course to be understood that the bearing engagement of the edges 9 and 13 against the bottom of the ring groove in which located is to tight so as to forbid such rotation, and is not loose, but is a reasonably snug bearing engagement such as will permit a ready turning of the grooving tool about the piston.

Figure 4:
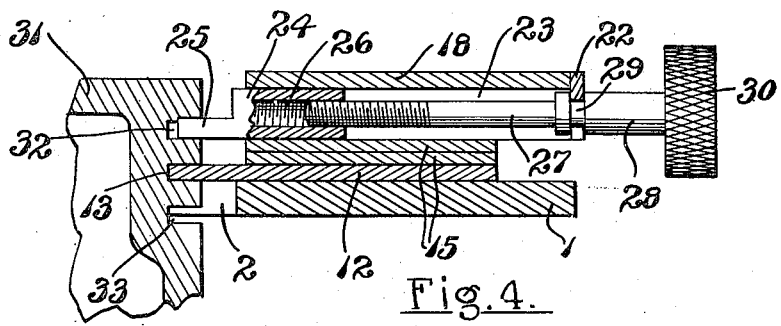
Fig. 4 is a vertical section substantially on the plane of line 4—4 of Fig. 2.

By operation of the head 30, the tool cutting end 25 is moved inwardly into the upper groove 32 which is being machined as shown in Fig. 4, and may continue to be fed inwardly until the bottom of the ring groove is reached, or at least far enough in radial depth that it will receive the wider ring which is to be installed therein. Because the lower ring groove with which the bearing jaws 5 and 11 is engaged, adjacent its bottom retains substantially its initial perfection of machining, it serves as a substantially perfect pattern for cutting the uppermost groove 32 when the tool is turned around the vertical axis of the piston. Of course it is to be understood that by using the proper thickness of shims 15 the jaw members may be received in any of the lower ring grooves in accordance with what may be desirable. The machining of the ring groove which is being recut and governed by the shape of the cutting end of the tool and which is subjected to wide variation therefore the invention is not limited in any sense to the mere truing of the sides of the uppermost battered ring groove in a used piston. The shims 15 are preferably of the form shown in Fig. 5 in order that they may be inserted or removed readily without entirely removing the screws 19 but merely loosening them a required amount.

The construction has proved very practical and useful in the salvaging of pistons, the material of a great many of which today is an aluminum alloy, the sides of the ring grooves of which become upset and battered and the groove widened because of the inertia effects of the heavier and harder metal piston ring against them.

The invention is defined in the appended claims and is to be considered comprehensive of all forms of structure coming within their scope.

We claim:

1. A body of flat metal laterally enlarged at its central portion and having an opening at said central portion through which the grooved end of a piston may be passed, said body at each end thereof having an outwardly extending handle, guides in parallelism to each other located at opposite sides of said opening in general parallelism to the length of the body, jaw members located one at each side of the opening slidably mounted on said body and located between and guided by said guides, said jaw members at adjacent ends having spaced jaws with angularly disposed inner edges whereby the jaws may be adjusted relative to a groove in a piston located in said opening so as to enter said groove and bear against the bottom thereof at four spaced apart points, means associated with each of the jaw members for securing them against movement on said body, a tool carrying block located at the outer side of one of said jaws and securable in fixed relation thereto, a cutting tool adjustably mounted on said block a preselected distance from said jaw on which the block is secured having a groove cutting end adapted to be moved into a groove of a piston outwardly of the groove in which said jaw members are engaged, and means for feeding said cutting tool into said outer groove.

2. A body having an opening therethrough of a size to permit the grooved end of a piston to be entered into said opening with the axis of the piston at right angles to the plane of the body, a jaw member located against a surface of the body and to one side of said opening, said jaw member having spaced jaws with angularly disposed inner edges, said edges of the jaw being adapted to be received in a groove of a piston located in said opening, means for securing the jaw member against movement, a second jaw member at the opposite side of said opening having spaced jaws with angularly disposed inner edges, means for adjustably mounting said second jaw member on the body for movement toward or away from the first jaw member, said edge portions of the jaws being adapted to be received in the same ring groove as the jaws of the first jaw member, a block secured over the first jaw member and a groove cutting tool movably mounted on said block and having a cutting portion spaced a preselected distance from said jaws adapted to enter a groove of the piston spaced from the groove in which said jaw members are engaged, means for manually feeding said tool into and out of said groove which is to be cut, manually engageable means extending from said body for turning it about the axis of a piston with which said jaw members are engaged, releasable means for connecting said block to the body over the first mentioned jaw member whereby the block may be spaced different distances from its associated jaw member, and a shim located between said first mentioned jaw member and the under side of the block for spacing the block from said jaw member a predetermined distance.

3. A body of flat metal laterally enlarged at its central portion and having an opening at said central portion through which the grooved end of a piston may be passed, said body at each end thereof having an outwardly extending handle, guides in parallelism to each other located at opposite sides of said opening in general parallelism to the length of the body, jaw members located one at each side of the opening slidably mounted on said body and located between and guided by said guides, said jaw members at adjacent ends having spaced jaws with angularly disposed inner edges whereby the jaws may be adjusted relative to a groove in a piston located in said opening so as to enter said groove and bear against the bottom thereof at spaced apart points, means associated with each of the jaw members for securing them against movement on said body, a tool carrying block located at the outer side of one of said jaws and securable in fixed relation thereto, a cutting tool adjustably mounted on said block having a groove cutting end adapted to be moved into the groove of a piston outwardly of the groove in which said jaw members are engaged, means for feeding said cutting tool into said outer groove, said jaw member with which said block is associated having spaced slots therein and said body having openings therethrough in conjunction with said slots, said block having threaded openings, cap screws passing through the openings in the body, the slots in the jaw member and threading into said block, and a shim of predetermined thickness disposed between the adjacent sides of said block and its associated jaw member, said shim having open recesses in a side thereof whereby it may be located between the adjacent sides of the body and block with the cap screws disposed in said recesses of the shim.

4. A body having an opening therethrough through which the grooved end of a piston may be passed, manually operable means on said body for turning said body about an axis, jaw members movably mounted at a surface of the body having jaws with inner edges to extend across said opening and enter a piston ring groove of a piston located in said opening, means for adjusting said jaws to different positions and for securing them in such positions, a block located above one of said jaw members, releasable means for connecting said block to the body over the first mentioned jaw member, whereby the block may be spaced different distances from its associated jaw member, and a shim located between said first mentioned jaw member and the under side of the block for spacing the block from said jaw member a predetermined distance.

JOHN E. ANDERSON.
JOHN H. BALLARD.
HARRY E. POTTER.